Patented May 30, 1933

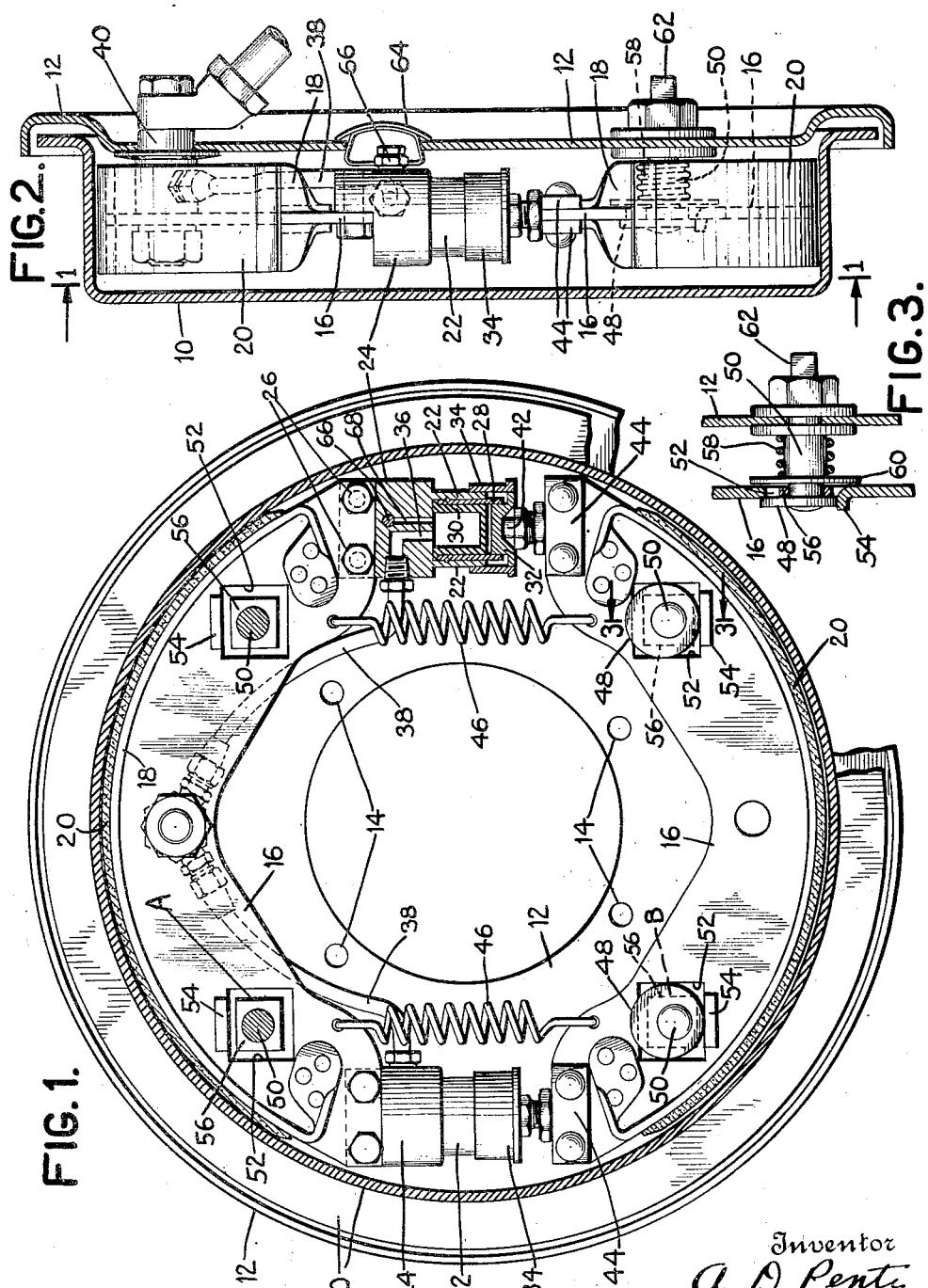

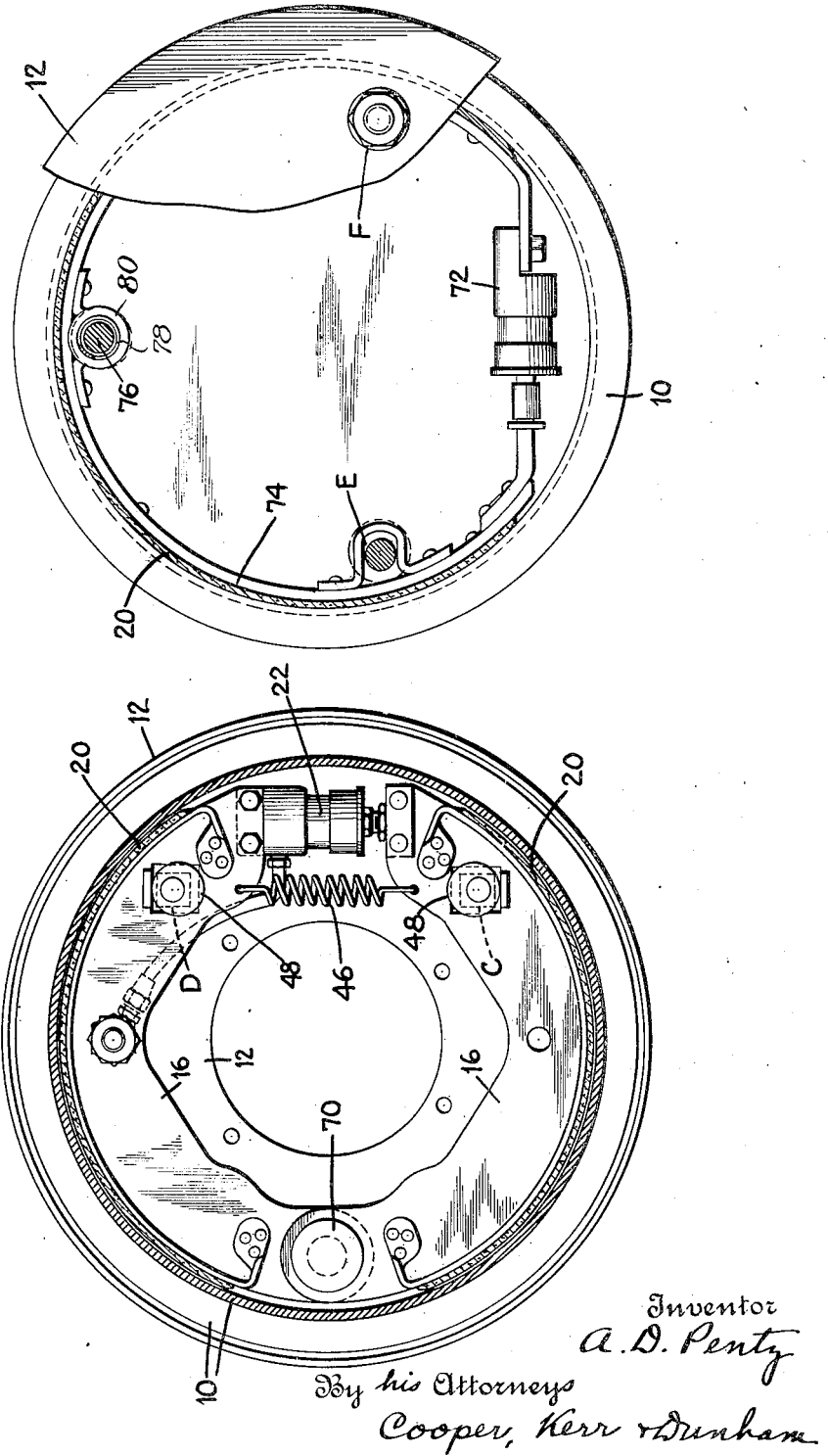

1,912,217

UNITED STATES PATENT OFFICE

ALBERT D. PENTZ, OF NEW YORK, N. Y., ASSIGNOR TO PENTZ MOTOR BRAKE CORPORATION, OF NEW YORK, N. Y., A CORPORATION OF NEW YORK

HYDRAULIC BRAKE FOR VEHICLES

Application filed May 9, 1929. Serial No. 361,593.

This invention pertains to hydraulic brakes of the kind particularly adapted for automobile use, and is an improvement on the invention disclosed in my copending application Serial No. 271,673, filed April 21, 1928, and entitled "Improvements in hydraulic brakes".

The principal object of this invention is to improve the self-energizing features of brakes of that kind.

Further and other objects will be apparent from the specification and claims, and from the drawings which show by way of illustration what is now considered the preferred form of the invention.

Fig. 1 is a side sectional elevation (on the line 1—1 of Fig. 2) of one form of the invention, with one of the hydraulic actuating devices in cross-section.

Fig. 2 is a view of Fig. 1 from the left, with the drum broken away.

Fig. 3 is an enlarged detail in cross section, on the line 3—3 of Fig. 1.

Fig. 4 is a side view of a modification of Fig. 1, in which only one actuating device is used in combination with a pair of hinged shoes.

Fig. 5 is a side view of another modification of Fig. 1, in which a single actuating device is used in connection with a single brake band.

In the drawings, 10 is a brake drum arranged to be attached to a wheel, while 12 is a stationary apron designed for attachment to a fixed part of the axle by bolts through holes 14. Within drum 10 are two oppositely disposed shoes having webs 16 to which are riveted circumferential flanges 18 faced with friction lining 20.

Between the adjacent ends of the upper and lower shoes are the two hydraulic actuating devices, each device being operatively attached to upper web 16. Each device comprises a downwardly projecting cylinder 22 having an extension 24 through which pass bolts 26 to fasten the member to upper web 16. Cylinder 22 is lined with a sleeve 28 and within the sleeve is a rubber expansible member 30. In the lower end of sleeve 28 is a piston 32, and a tubular boot 34 of rubber extends upwardly from the outer rim of piston 32.

Hydraulic operating fluid is admitted to the interior of members 30 through passages 36 and pipes 38 which enter a fitting 40 attached to web 16 of the upper shoe. Members 30 and the pipes are normally full of oil and when additional oil is forced into member 30 it expands, forcing piston 32 downwardly. The lower end of the piston is countersunk to accommodate the upper end of a stud 42 adjustable in block 44 fast to the end of lower web 16.

When members 30 expand and pistons move, the shoes are forced apart at both their ends to apply the shoes to the drum. When pressure is released, springs 46 serve to return the shoes to their normal positions against eccentric stops 48 on the inner ends of studs 50, secured to apron 12 (Figs. 2 and 3). There are four studs 50, each stud passing through a rectangular slot 52 in web 16, each slot being provided with a flange 54 to contact with eccentric stop 48. Surrounding each stud 50, within slot 52, is a square sided collar 56 which takes the thrust against the sides of the slot whenever occasion requires. Coil springs 58 surrounding studs 50, acting through washers 60, serve to hold the web of the shoe resiliently at proper distance from apron 12.

In the embodiment in Fig. 1, slots 52 are so arranged and proportioned that contact occurs between washer 56 and web 16 on the right sides of the two slots 52 at the left side of the drawing. At all other points there is sufficient clearance between washers 56 and the sides of slots 52 to prevent contact therebetween. This feature is designed to bring about a full "servo" or self-actuating effect whenever the brake is applied with the drum rotating in either direction, as will now be pointed out.

If the brake be applied while the drum is rotating counterclockwise, friction between the shoes and drum will rotate the shoes in the same direction as the drum, until contact occurs at A (Fig. 1), that being the sole point of anchorage of either shoe on apron 12. Inasmuch as the hydraulic actuating devices have a certain amount of flexibility, and as the upper shoe is anchored near its forward end, and as the lower shoe is flexibly connected at its forward end to the rear end of the upper shoe, both shoes have a servo or self-actuating effect. By "forward" end is meant the end furthest advanced circumferentially in the direction of drum rotation.

During the above application, the lower shoe will follow the motion of the drum until the flange of piston 32 at the right in Fig. 1 abuts the lower end of cylinder liner 28. The left hand cylinder opens up to accommodate the same quantity of oil as is expelled from the right hand device, the two devices being interconnected by pipes 38.

If the drum is rotating clockwise when the brake is applied, the anchorage will be at surface B, and the action of the entire brake will be as before, except in the reverse direction.

Since square collars 56 at the right-hand side of Fig. 1 are not used for thrust purposes they may be omitted if desired. However, they are preferably left in position as shown, because they serve a useful purpose in holding the shoes in position temporarily during assembly and servicing operations.

By applying a wrench to the flattened outer ends 62 of studs 50, eccentric stops 48 may be rotated and the normal or home positions of the shoes thereby adjusted as linings 20 wear away. By removing spring caps 64 (Fig. 2) access is provided to bleeder valves 66 by means of which air may be removed through passage 68 from the interiors of the hydraulic devices.

Fig. 4 shows a modified arrangement in which only one hydraulic device is used, the other ends of the shoes being connected by a hinge pin 70. When rotation of the drum is counterclockwise, anchorage takes place at C, and when rotation is in the other direction anchorage will be at D. In either case the entire brake is self-energizing.

In Fig. 5, still another modification is shown, in which one hydraulic device 72 is used and the brake shoe is in the form of a single spring band 74. This form is also self-energizing, the anchorage being at either E or F, depending on direction of rotation of the drum. A centering device 76 is provided at a point opposite the hydraulic cylinder, but there is no anchor at that point. Spring 78 surrounding pin 76 and acting through washer 80 serves to hold the brake band resiliently at proper distance from apron 12.

It is to be understood that the invention is not limited to the specific construction and embodiment herein described but may be used in other ways without departure from its spirit as defined by the following claims.

I claim—

1. In a brake shoe for a vehicle, a rotatable drum adapted for attachment to a wheel, a brake shoe assembly within the drum and rotatable therewith to a limited extent, hydraulic means carried by said assembly and operable to apply said shoe assembly to said drum, and means effective to anchor said assembly at the forward end thereof when the brake is applied, said assembly comprising a pair of diametrically opposed shoes having adjacent ends thereof flexibly interconnected, and carrying said hydraulic means between the other ends thereof whereby the shoes are spread apart to engage the drum.

2. In a brake for a vehicle, a rotatable drum adapted for attachment to a wheel, a brake shoe assembly within the drum and rotatable therewith to a limited extent, hydraulic means carried by said assembly and operable to apply said shoe assembly to said drum, and means effective to anchor said assembly at the forward end thereof when the brake is applied, said assembly comprising a pair of diametrically opposed shoes carrying said hydraulic means between the adjacent ends thereof whereby the shoes are spread apart to engage the drum.

3. In a brake for a vehicle, a rotatable drum adapted for attachment to a wheel, a brake shoe assembly within the drum and rotatable therewith to a limited extent, hydraulic means carried by said assembly and operable to apply said shoe assembly to said drum, and means effective to anchor said assembly at the forward end thereof when the brake is applied, said assembly comprising a pair of diametrically opposed shoes carrying said hydraulic means between the adjacent ends thereof whereby the shoes are spread apart to engage the drum, said means being adapted to allow relative circumferential movement of said shoes, substantially as described.

4. In a brake for a vehicle, a rotatable drum adapted for attachment to a wheel, a brake shoe assembly within the drum and rotatable therewith to a limited extent, hydraulic means carried by said assembly and operable to apply said shoe assembly to said drum, and means effective to anchor said assembly at the forward end thereof when the brake is applied, said assembly comprising a pair of diametrically opposed shoes carrying said hydraulic means between the adjacent ends thereof whereby the shoes are spread apart to engage the drum, said means being interconnected to permit flow of oil therebetween, whereby relative circumferential movement of said shoes is effected when the brake is applied.

In testimony whereof I hereto affix my signature.

ALBERT D. PENTZ.